US012415201B2

(12) United States Patent
Kastner

(10) Patent No.: US 12,415,201 B2
(45) Date of Patent: Sep. 16, 2025

(54) COATING DEVICE AND COATING METHOD

(71) Applicant: Collin Lab & Pilot Solutions GmbH, Maitenbeth (DE)

(72) Inventor: Friedrich Kastner, Grieskirchen (AT)

(73) Assignee: Collin Lab & Pilot Solutions GmbH, Maitenbeth (DE)

( * ) Notice: Subject to any disclaimer, the term of this patent is extended or adjusted under 35 U.S.C. 154(b) by 0 days.

(21) Appl. No.: 18/290,964

(22) PCT Filed: Jul. 12, 2022

(86) PCT No.: PCT/EP2022/069440
§ 371 (c)(1),
(2) Date: Jan. 22, 2024

(87) PCT Pub. No.: WO2023/006407
PCT Pub. Date: Mar. 3, 2023

(65) Prior Publication Data

US 2025/0100006 A1 Mar. 27, 2025

(30) Foreign Application Priority Data

Jul. 26, 2021 (EP) .................................... 21187687

(51) Int. Cl.
*B05C 9/10* (2006.01)
*B05C 1/08* (2006.01)

(52) U.S. Cl.
CPC .......... *B05C 1/0813* (2013.01); *B05C 1/0808* (2013.01); *B05C 1/0817* (2013.01); *B05C 9/10* (2013.01)

(58) Field of Classification Search
None
See application file for complete search history.

(56) References Cited

U.S. PATENT DOCUMENTS 4,732,800 A 3/1988 Groshens
2004/0134596 A1 7/2004 Rosati et al.
(Continued)

FOREIGN PATENT DOCUMENTS

EP 2351618 A1 8/2011
EP 3493300 A1 6/2019

OTHER PUBLICATIONS

European Patent Office. International Search Report and Written Opinion of the International Searching Authority in Application No. PCT/EP2022/069440, mailed Sep. 20, 2022, 11 pages.

*Primary Examiner* — Charles Capozzi
(74) *Attorney, Agent, or Firm* — Stoel Rives LLP

(57) ABSTRACT

A coating device for the register-accurate application of plastic material to a carrier sheet comprises a first coating roll and a downstream second coating roll, wherein each of the first and second coating rolls has at least one cavity that can be filled with plastic material by means of at least one nozzle. First and second stripping means strip the respective first and second coating rolls. The first coating roll interacts with a first mating roll and coats a first carrier sheet side and the second coating roll interacts with a second mating roll and coats a second carrier sheet side. The second mating roll comprises at least one mating cavity corresponding to the at least one first cavity. In addition, the coating device comprises at least one carrier sheet positioning device and a coated region detection device. Related methods of coating a carrier sheet are also disclosed.

22 Claims, 3 Drawing Sheets

(56) References Cited

U.S. PATENT DOCUMENTS

| | | | | |
|---|---|---|---|---|
| 2011/0200747 A1* | 8/2011 | Kida | D21H 23/56 427/209 |
| 2014/0083316 A1* | 3/2014 | Choi | B41F 33/0081 101/485 |
| 2021/0237184 A1* | 8/2021 | Zenou | H05K 3/3478 |

* cited by examiner

COATING DEVICE AND COATING METHOD

RELATED APPLICATIONS

This application is a national stage under 35 U.S.C. § 371 of International Application No. PCT/EP2022/069440, filed Jul. 12, 2022, which claims priority of European Patent Application No. 21187687.5, filed Jul. 26, 2021.

TECHNICAL FIELD

The application relates to a coating device and a coating method. More precisely, the application relates to a coating device and method for the register-accurate application of plastic material to a carrier sheet.

BACKGROUND

Known from the prior art (EP 3 493 300 A1) is a device and a method for applying polymer patches to a substrate. However, this prior art describes merely the register-accurate deposit with a structured roll at a single location of the substrate.

Further, known from U.S. Pat. No. 4,732,800 is a thermo-adhesive covering having a textile support element and a first heat-fusible layer arranged at a side referred to as front surface and a second layer, which is less easily heat-fusible than the first layer. Here, the second layer constitutes a barrier for the first layer if same is plastic. The second layer is arranged at the rear side of the support element.

SUMMARY

A need remains for a device and a method with which a user is able to perform a simple and register-accurate coating of a carrier sheet. Within the scope of this application, "register-accurate" is understood to mean that, analogous to printing nomenclature, coated regions of a front side and rear side of a medium to be coated and/or having been coated (e.g. carrier sheet) are or have been applied congruently and/or more accurately. The assignment as to which regions are to be register-accurate to which regions can be selected freely. It is also possible for subregions to be applied so as to be register-accurate to one another (intersection of the regions).

According to one aspect of the present disclosure, a coating device for the register-accurate application of plastic material to a carrier sheet comprises a first coating roll and a downstream second coating roll. The first coating roll has at least one first cavity, which can be filled with plastic material by means of at least one first nozzle. The second coating roll has at least one second cavity, which can be filled with plastic material by means of at least one second nozzle. A first stripping means strips the first coating roll and a second stripping means strips the second coating roll. The first coating roll interacts with a first mating roll and the second coating roll interacts with a second mating roll. The second mating roll comprises at least one mating cavity corresponding to the at least one first cavity. The coating device further comprises at least one carrier sheet positioning device and at least one region detection device.

The carrier sheet is the medium to be coated by the coating device and can be an endless strip of a film, for example. The carrier sheet can comprise metal and/or plastic. Further, the carrier sheet can be understood to also mean individual sections of the medium, which are sent through the coating device individually or placed onto a conveyor belt individually or connected individually by connectors to form a band. The carrier sheet has a first carrier sheet side and a second carrier sheet side.

The second coating roll is arranged downstream of the first coating roll, i.e. the second coating roll is arranged after the first coating roll in a processing direction of the coating device and/or in a run-through direction of the carrier sheet through the coating device. During operation of the coating device, the carrier sheet is conveyed so as to pass between the first coating roll and the first mating roll and then between the second coating roll and the second mating roll (processing direction).

The stripping means strips excess plastic material from the respective cavity. The stripped-off material can be collected, optionally prepared and reused for filling the cavity/cavities.

The second mating roll has at least one mating cavity, which corresponds to the first cavity, i.e. has at least essentially the same, or a larger, shape and essentially the same position as the first cavity. This means that, during operation of the coating device, a first region of plastic material, which has been applied to the carrier material by the at least one first cavity, is received by the second mating roll and/or by the mating cavity formed therein and can thus not be put out of shape (e.g. deformed or squeezed) by the second mating roll. The at least one mating cavity can coat the second carrier sheet side of the carrier sheet and/or of the carrier material with plastic material in a second region by the second coating roll by means of the at least one second cavity. Further, the two regions can thus be applied to the carrier sheet in a register-accurate manner. The two regions opposite each other on the two carrier sheet sides may overlap only in a subregion as desired and/or needed, or also be located exactly on top of each other. The at least one mating cavity can correspond to the at least one first cavity in terms of its dimensioning but may also be selected larger. The dimensioning of the at least one mating cavity depends on a plurality of factors, e.g. the plastic material, the material of the carrier sheet, a run-through speed of the carrier sheet through the coating device, temperature, etc.

The carrier sheet positioning device is provided and suitable for positioning the alignment and/or position of the carrier sheet in the coating device relative to at least one of the coating rolls and/or relative to at least one of the mating rolls. Alternatively or additionally, the carrier sheet positioning device can also be provided and suitable for positioning the alignment and/or position of at least one of the coating rolls and/or of at least one of the mating rolls relative to the carrier sheet.

The region detection device detects the position of a region of plastic material coated by the at least one first cavity at the first carrier sheet side. The region detection device can be used to determine the position of the first coated region at the first carrier sheet side. The carrier sheet positioning device can be controlled accordingly on the basis of the detected information, such that the second region at the second carrier sheet side can be applied by the at least one second cavity so as to be register-accurate to the first region. Further, the carrier sheet positioning device can position the carrier sheet accordingly on the basis of information of the region detection device, such that the at least one mating cavity coincides exactly, or at least essentially exactly, with the first region and thus the first region is not damaged by the second mating roll. This can be of advantage because the quality of the product made by the device can thus be increased.

Any type of thermoplastic plastic can be used as plastic material. Here, it is irrelevant whether the materials are unmodified, organic, or mineral-filled. The plastic material, however, can also be highly-filled plastic material, i.e. plastic material which has at least 50 wt % solids and/or fillers.

The device can have the advantage that a carrier sheet can be coated in a register-accurate manner on both sides with at least two regions of plastic material, and in a manner that is economic and quick and of high quality.

In a device according to another aspect of the present disclosure, at least one inner surface of at least one of the cavities has a structure. The structure can influence e.g. the detaching or adhering of the plastic material from the cavity. Also, the structure of the at least one inner surface of the cavity can give a corresponding structure to the region of plastic material on the carrier sheet. This can be of advantage as the structure can positively influence properties of the product and/or production process.

In a device according to another aspect of the present disclosure, at least one inner surface of at least one of the cavities has a coating. The coating can reduce or prevent e.g. the detaching and/or the adhesion of the plastic material or also influence the surface roughness of the region coated with plastic. This can be of advantage as the coating can positively influence properties of the product and/or production process.

A device according to another aspect of the present disclosure further comprises a thickness measure with respect to a filling and/or the filling level of the at least one first cavity and/or of the at least one second cavity. In other words, the thickness measure measures the filling of the at least one first and/or second cavity. This can be of advantage as the filling of the cavity/cavities by the respective nozzles can thus be controlled selectively and e.g. a quantity of the plastic material to be stripped by the respective stripping device can be kept as small as possible while simultaneously ensuring a complete and/or sufficient filling of the cavity/cavities.

In a device according to another aspect of the present disclosure, the carrier sheet positioning device comprises at least one of a sliding means of the first and/or second coating roll, or at least one carrier sheet moving means. The sliding means can move the respective coating roll parallel to its axis of rotation, in particular in or opposite the processing direction. The carrier sheet moving means can move the carrier sheet through the device on its path. This can be achieved e.g. by means of table rolls, rolls on rotating structures, or rotatable guide rollers, each of which act on the carrier sheet. This may have the advantage that a suitable way of influencing the run of the carrier sheet through the machine can be selected for each material of carrier sheet. For example, in case of thin films it can be advantageous to select an adjustment of the coating roll(s) as this minimizes a mechanical impact on the carrier sheet.

In a device according to another aspect of the present disclosure, the region detection device comprises at least one of a mechanical sensor, an optical sensor or a coding at the first and/or second coating roll. A mechanical sensor can be a limit switch or contact switch, for example. An optical sensor can be a camera or a camera system, a backlight sensor, or a laser measure system. A coding can be installed e.g. on the front end of at least one of the coating rolls. The coding may include as information the rotational angle and therefore, provided that the shape of the coating roll is known, also the position of the cavity and thus of the coated region. This can be of advantage as the coated regions can thus be detected more accurately.

In a device according to another aspect of the present disclosure, the region detection device detects the position of at least one edge of a first region of plastic material coated by the at least one first cavity on the first carrier sheet side of the carrier sheet and/or at least one edge of the carrier sheet. This can be of advantage as the edges, for one thing, serve as a reference and are at least of contributory significance for the quality of the manufactured product. Further, the edges may be detectable more simply and more reliably, thereby increasing the quality.

A device according to another aspect of the present disclosure comprises a dispenser unit for applying at least one film strip. The film strip can be used e.g. for conducting electric current. This can be of advantage because it enables products of high functional quality to be manufactured by means of the device. For example, a dispenser unit can be arranged before the first pair of rolls, between the first and the second pair of rolls, or also after the second pair of rolls.

In a device according to another aspect of the present disclosure, the at least one film strip is applied to the carrier sheet by the dispenser unit along at least one edge of a region of plastic material coated by the at least one first cavity and/or the at least one second cavity. This can be of advantage because it enables products of high functional quality to be manufactured by means of the device. The exact positioning of a film strip along one of the edges can be done with the region detection device as well as with the carrier sheet positioning device.

A device according to another aspect of the present disclosure further comprises at least one plasticizing unit, which is arranged upstream of the at least one first nozzle and/or of the at least one second nozzle. The plasticizing unit can comprise at least one of an extruder, a melt pump or a piston accumulator. If the same plastic material is to be inserted into the cavities by means of the two nozzles, it may be sufficient to provide a single plasticizing unit to this end. Yet, it may also be advantageous, depending on the requirements and plant size, if each nozzle and/or each coating roll is assigned its own plasticizing unit. This can be advantageous for filling the cavities of the at least one first and at least one second coating roll with plastic.

In a device according to another aspect of the present disclosure, the first and/or second stripping means comprises at least one of a squeegee or a squeegee roll. This can be of advantage because excess plastic material can be removed from the coating roll(s) simply and reliably. Here, it may be expedient to temper the, one or multiple, stripping means in order to facilitate a clean stripping of the excess material on the roll. Depending on the material used and on the process control, the tempering of the stripping means can be understood to mean both a heating and a cooling.

In a device according to another aspect of the present disclosure, the at least one first nozzle and/or the at least one second nozzle is/are adjustable. The adjustability may refer to the size of the outlet cross section and/or to the shape of the outlet cross section of the nozzle. This can be of advantage as a quantity and/or velocity of a filling of the cavity/cavities can thus be selectively influenced.

A device according to another aspect of the present disclosure further comprises at least one cleaning unit for cleaning the carrier sheet, wherein the cleaning unit is provided and suitable for cleaning at least one side of the carrier sheet. The cleaning can comprise by at least one of mechanical, pneumatic, chemical or physical methods, such as, for example, brushes and/or cleaning agents can be used.

Advantageously, a cleaning unit can be positioned upstream of the first coating roll, viewed in processing direction. This can be of advantage as the carrier sheet can thus be prepared for the coating in an optimal manner, which can have a positive effect on the quality of the resulting product.

A device according to another aspect of the present disclosure further comprises at least one roughening unit for roughening the carrier sheet, wherein the roughening unit is provided and suitable for roughening at least one side of the carrier sheet. The roughening can be done by means of at least one mechanical, chemical or physical method, such as, for example, by means of brushes, abrasive belts (optionally with suction), plasma, solvent misting or heated embossing rolls. Advantageously, a roughening unit of the first coating roll can be positioned upstream, viewed in processing direction. This can be of advantage as the carrier sheet can thus be prepared for the coating in an optimal manner, which can have a positive effect on the quality of the resulting product.

A device according to another aspect of the present disclosure further comprises at least one smoothing unit for smoothing the carrier sheet, wherein the smoothing unit is provided and suitable for smoothing at least one side of the carrier sheet. The smoothing can be done by at least one mechanical, chemical or physical method, such as, for example, by means of a pressing crosspiece, or by means of a tensioning means. Advantageously, a smoothing unit of the first coating roll can be positioned upstream, viewed in processing direction. This can be of advantage as the carrier sheet can thus be prepared for the coating in an optimal manner, which can have a positive effect on the quality of the resulting product.

A device according to another aspect of the present disclosure further comprises at least one processing unit for processing the carrier sheet, wherein the processing unit is provided and suitable for processing at least one side and/or one edge of the carrier sheet. The processing unit can process e.g. one or both edges of the carrier sheet or provision holes, beads, doubling, printing of position markers, printing of codes, affixing of conducting patches, deckle trim with fixed blades or circular knives on the carrier sheet. Advantageously, a processing unit of the first coating roll can be positioned upstream, viewed in processing direction. Yet, alternatively or additionally, a processing unit can also be arranged between the two pairs of rolls, or also after the second coating roll. This can be of advantage as the functionality of the products that can be manufactured by the device can thus be increased.

In a device according to another aspect of the present disclosure, a mixer is arranged upstream of the at least one plasticizing unit. The mixer can be a dual or multiple screw extruder, for example. The mixer and/or the mixing unit can be configured in the form of a single, or multiple, screw extruder and can also be used directly as a plasticizing unit. Further, it is also possible to insert static mixers in accordance with the prior art in the melt flow in, or after, the plasticizing unit. This can have the advantage that the plasticizing unit can be provisioned with a homogeneous plastic mixture.

In a device according to another aspect of the present disclosure, the at least one plasticizing unit can be controlled via a throughput control. This can have the advantage that the cavity/cavities can thus be filled with plastic material in a defined and/or controlled manner.

In a device according to another aspect of the present disclosure, a feed block is arranged between the at least one plasticizing unit and the at least one first nozzle and/or the at least one second nozzle. This can be of advantage as it enables a coextrusion. In a feed block, plastic melts from multiple, at least from two, plasticizing units are stacked in layers, and a multi-layer material bond is thus realized. The technology of coextrusion by means of a feed block is known to the skilled person from the prior art.

In a device according to another aspect of the present disclosure, the at least one first nozzle and/or the at least one second nozzle are each configured as a deposit unit comprising multiple nozzles, wherein the multiple nozzles apply the plastic material to the first coating roll and/or to the second coating roll in succession or next to one another or so as to overlap. In other words, the deposit unit at the first and/or second coating roll is made up of more than one nozzle and thus enables the application of plastic bands that are positioned one behind the other, next to one another or so as to overlap. This can be of advantage because it enables better control of a filling of the cavity/cavities. The technology of coextrusion by means of a deposit unit is generally known to the skilled person from the prior art.

In a device according to another aspect of the present disclosure, the first and/or second nozzles are provided and suitable for inserting different plastic materials in the cavity. This can be of advantage as the coated regions can thus comprise multiple plastic materials.

In a device according to another aspect of the present disclosure, the at least one first and/or the at least one second cavity can have different levels and each level can be assigned at least one nozzle and at least one stripping unit. Therefore, a first level of the cavity can be filled with a plastic material and stripped before a second level is filled with an optionally different plastic material and stripped. Hence, a multi-layer region can therefore be applied to the carrier sheet in one processing step by means of a single cavity in a single coating operation.

Independent of this, the object of the disclosure is also achieved by a coating method for coating a carrier sheet with plastic material.

In accordance with the method, a filling of at least one first cavity of a first coating roll with plastic material by means of at least one first nozzle is provided here. Subsequently, the at least one first cavity is stripped. The plastic material is applied to a first carrier sheet side in a first coated region. Further, at least one second cavity of a second coating roll is filled with plastic material by means of at least one second nozzle, wherein the at least one second cavity is stripped. The position of the first coated region of plastic material coated by the at least one first cavity is detected by a region detection device. The plastic material is applied to a second carrier sheet side in a second coated region. Here, a second mating roll is controlled such that at least one mating cavity of the second mating roll the at least one mating cavity receives the first coated region during application of the plastic material to the second carrier sheet side.

As to the advantages and possible specific embodiments and/or advancements of the coating method reference is made to the above passages of the description in order to avoid unnecessary repetitions. It should also be mentioned in this context that the individual method steps and their chronological sequence need not necessarily take place in the specified order, but also a different chronological sequence is possible. Preferably, however, the specified method steps take place in a successive, and therefore sequential, chronological sequence.

BRIEF DESCRIPTION OF THE DRAWINGS

For the purpose of better understanding of the device, it will be elucidated in more detail by means of the figures below. The method will be explained in more detail in the description of the device.

The figures show in a respectively very simplified schematic representation.

DETAILED DESCRIPTION OF EXEMPLARY EMBODIMENTS

First of all, it is to be noted that, in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, these specifications of location are to be analogously transferred to the new position.

The term "in particular" shall be understood below to mean that it can be a possible, more specified embodiment or narrower specification of an object, or of a method step, but need not necessarily represent an imperative, preferred embodiment of same, or an imperative procedure.

In their present use, the terms "comprising," "comprises," "having," "includes," "including," "contains," "containing" and any variations of these shall cover a non-exclusive inclusion.

Other terms that are also used are "optionally" or "alternatively." These are to be understood to mean that this method step or this plant component is generally present but can be used depending on the conditions of use and need not necessarily be used.

Figure 1:
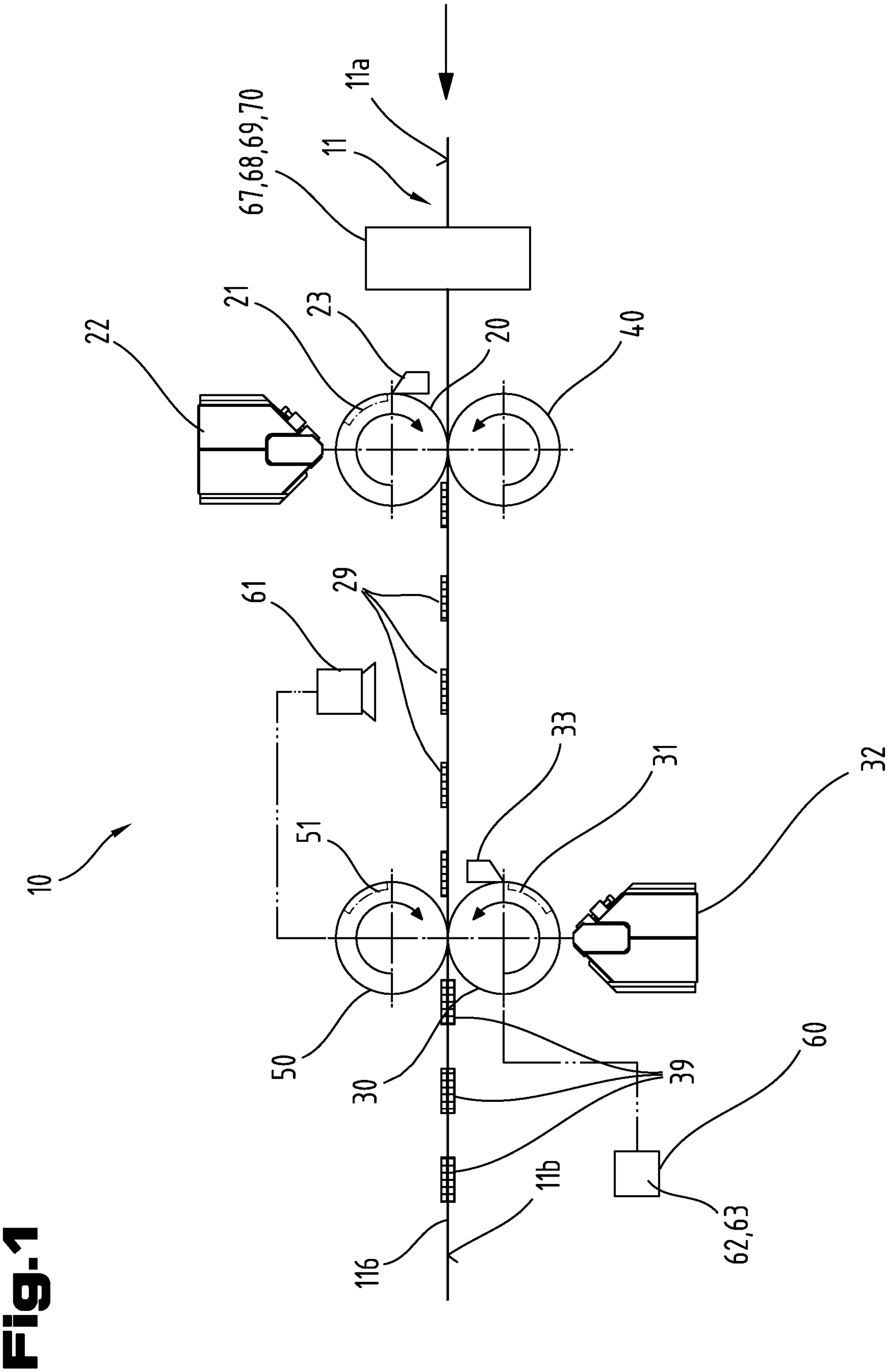
FIG. 1 a grossly schematic coating device in a side view.

FIG. 1 shows a grossly schematic coating device 10 in a side view and/or represents a method process and/or a method flow chart of a coating method for coating a carrier sheet 11 with plastic material.

The coating device 10 is provided for the register-accurate application of plastic material to a carrier sheet 11, in particular to a first carrier sheet side 11*a* of the carrier sheet 11 and/or to a second carrier sheet side 11*b* of the carrier sheet 11. To that end, the coating device 10 comprises a first coating roll 20 and a second coating roll 30 arranged downstream of the first coating roll 20. Here, terms such as "downstream," "after" or "subsequent" refer to the processing direction and/or process flow direction of the coating device 10. Here, the carrier sheet 11 is inserted in the coating device and guided through same so as to follow the processing direction. In the flow chart shown in FIG. 1, the processing direction is from right to left and is indicated by means of an arrow for better understanding.

The first coating roll 20 has at least one first cavity 21 and can be filled with a plasticized plastic material by means of at least one first nozzle 22. The second coating roll 30 has at least one second cavity 31 and can be filled with a plasticized plastic material by means of at least one second nozzle 32. A first stripping means 23 strips the first coating roll 20 and a second stripping means 33 strips the second coating roll 30.

Here, the first coating roll 20 interacts with a first mating roll 40, wherein the carrier sheet 11 is guided through between the first coating roll 20 and the first mating roll 40. Here, the first carrier sheet side 11*a* and/or, in the example represented, the top side of the carrier sheet 11 faces the first coating roll 20. The first carrier sheet side 11*a* of the carrier sheet 11 is thus coated by means of the first coating roll 20.

The second coating roll 30 interacts with a second mating roll 50, wherein the carrier sheet 11 is guided through between the second coating roll 30 and the second mating roll 50. Here, the second carrier sheet side 11*b* and/or, in the example represented, the bottom side of the carrier sheet 11 faces the second coating roll 30. The second carrier sheet side 11*b* of the carrier sheet 11 is thus coated by means of the second coating roll 30.

The second mating roll 50 comprises at least one mating cavity 51, which at least one mating cavity 51 corresponds to the at least one first cavity 21. Furthermore, the coating device 10 comprises at least one carrier sheet positioning device 60.

Here, the coating device 10 shown in FIG. 1 can be used in a coating method for coating a carrier sheet 11 with plastic material. In the method, a carrier sheet 11 is guided through a coating device 10 and coated at least partially, preferably on both sides. To that end, the method first provides a filling of at least one first cavity 21 of a first coating roll 20 with a plastic material by means of at least one first nozzle 22. To remove excess plastic material, the at least one first cavity 21 is stripped by means of a first stripping means 23.

A rotational movement of the first coating roll 20 ensures that the plastic material is applied to a first carrier sheet side 11*a* of the carrier sheet 11, resulting in a first coated region 29. Subsequently, at least one second cavity 31 of a subsequent, second coating roll 30 is filled with plastic material by means of at least one second nozzle 32. Also this second cavity 31 is stripped by means of a second stripping means 33. A rotational movement of the second coating roll 30 ensures that the plastic material is applied to a second carrier sheet side 11*b* of the carrier sheet 11, resulting in a second coated region 39. Here, a second mating roll 50, which interacts with the second coating roll 30, is controlled such that at least one mating cavity 51 of the second mating roll 50 the at least one mating cavity 51 receives the first coated region 29 during application of the plastic material to the second carrier sheet side 11*b*.

At least one inner surface of at least one of the cavities 21, 31, 51 can have a structure. FIG. 1 shows that, due to the structures of the cavities 21, 31, 51, the first coated region 29 and the second coated region 39 have a structure. It may also be the case that at least one inner surface of at least one of the cavities 21, 31, 51 has a coating, so that the plastic material received in the cavities 21, 31, 51 and to be released does not adhere to the cavities 21, 31, 51.

The coating device 10 can further be configured with at least one region detection device 61, which detects the position of a first coated region 29 of plastic material coated by the at least one first cavity 21.

The coating device 10 can further comprise a thickness measure—not shown in the figures—which measures a filling of the at least one first cavity 21 and/or of the at least one second cavity 31. For example, a thickness measure can be configured as a component of the region detection device 61. Alternatively, a thickness measure can also be configured in the respective cavity 21, 31, or in close proximity to the respective cavity 21, 31.

The carrier sheet positioning device 60 can comprise at least one sliding means 62 for sliding the first and/or second coating roll 20, 30, and/or at least one carrier sheet moving means 63 for moving the carrier sheet 11.

Furthermore, the region detection device 61 can comprise a mechanical sensor, an optical sensor, and/or a coding at the first and/or at the second coating roll 20, 30. The region detection device 61 can detect the position of at least one edge of the first coated region 29 and/or of at least one edge of the carrier sheet 11.

Further, the coating device 10 can comprise a dispenser unit for applying at least one film strip, which dispenser unit is not shown in the figures because it is generally known to those working in the field. Here, the dispenser unit can be arranged at the front end of the coating device 10, i.e. before the first pair of rolls 20, 40, between the pairs of rolls 20,40 and/or 30, 50 or after the second pair of rolls 30, 50. Here, the at least one film strip can be applied to the carrier sheet 11 by the dispenser unit along at least one edge of the first and/or second coated region 29, 39.

It may also be the case that the coating device 10 comprises at least one plasticizing unit, which is arranged upstream of the at least one first nozzle 22 and/or of the at least one second nozzle 32 and is not shown in the figures because it is generally known to those working in the field. A mixer, which is also not shown in the figures, can be arranged upstream of the at least one plasticizing unit. It may also be the case that the at least one plasticizing unit is controlled via a throughput control, which is also not shown in the figures. In addition, a feed block can be arranged between the at least one plasticizing unit and the at least one first nozzle 22 and/or the at least one second nozzle 32. Also the feed block is not represented in FIG. 1 because it is sufficiently known to those working in the field.

The first and/or the second stripping means 23, 33 can comprise at least one squeegee and/or one squeegee roll. It may also be the case that the at least one first nozzle 22 and/or the at least one second nozzle 32 is adjustable.

Further, the coating device 10 can comprise at least one cleaning unit 67 for cleaning the carrier sheet 11, wherein the cleaning unit 67 is provided and suitable for cleaning at least one side 11*a*, 11*b* of the carrier sheet 11. Further, the coating device 10 can comprise at least one roughening unit 68 for roughening the carrier sheet 11, wherein the roughening unit 68 is provided and suitable for roughening at least one side 11*a*, 11*b* of the carrier sheet 11. Further, the coating device 10 can comprise at least one smoothing unit 69 for smoothing the carrier sheet 11, wherein the smoothing unit 69 is provided and suitable for smoothing at least one side 11*a*, 11*b* of the carrier sheet 11. Further, the coating device 10 can comprise at least one processing unit 70 for processing the carrier sheet 11, wherein the processing unit 70 is provided and suitable for processing at least one side 11*a*, 11*b* and/or one edge of the carrier sheet 11.

For the sake of simplicity, the cleaning unit 67, the roughening unit 68, the smoothing unit 69 and the processing unit 70 are represented in FIG. 1 as a joint unit. Yet, evidently, it may also be expedient and/or required that the units are arranged individually and/or independent of one another at the most suitable respective positions in the coating device 10.

Furthermore, it may be the case that the at least one first nozzle 22 and/or the at least one second nozzle 32 are each configured as a deposit unit comprising multiple nozzles. Here, the multiple nozzles can apply the plastic material to the first coating roll 20 and/or to the second coating roll 30 in succession or next to one another or so as to overlap.

In particular, the first 22 and/or second nozzles 32 can be provided and suitable for inserting different plastic materials in the cavity 21, 31.

Figure 2:
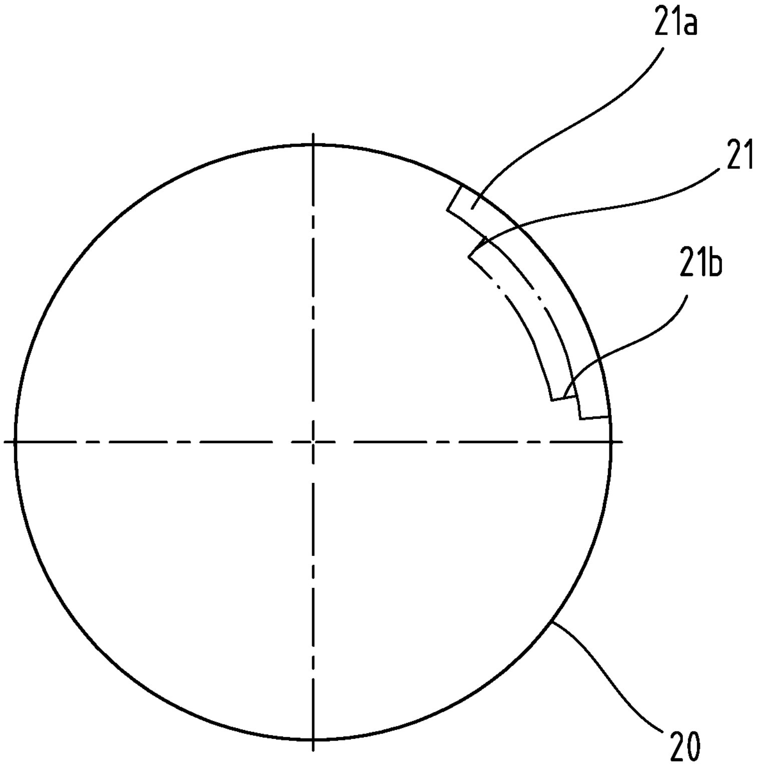
FIG. 2 a detailed view of a coating roll.

FIG. 2 shows a detailed view of a coating roll 20 in a side view. What is shown here is that the at least one first cavity 21 can have different levels 21*a*, 21*b*, wherein each level 21*a*, 21*b* can be assigned at least one nozzle and at least one stripping unit. Therefore, a first level 21*a* of the cavity 21 can be filled with a plastic material and stripped before a second level 21*b* is filled with an optionally different plastic material and stripped. Evidently, it may also be the case that the second level 21*b* is filled first and the first level 21*a* subsequently. Also a simultaneous filling of the levels 21*a*, 21*b* is conceivable. It should be understood that also the second coating roll 30 and/or its cavity 31 can be configured with multiple levels.

Figure 3:
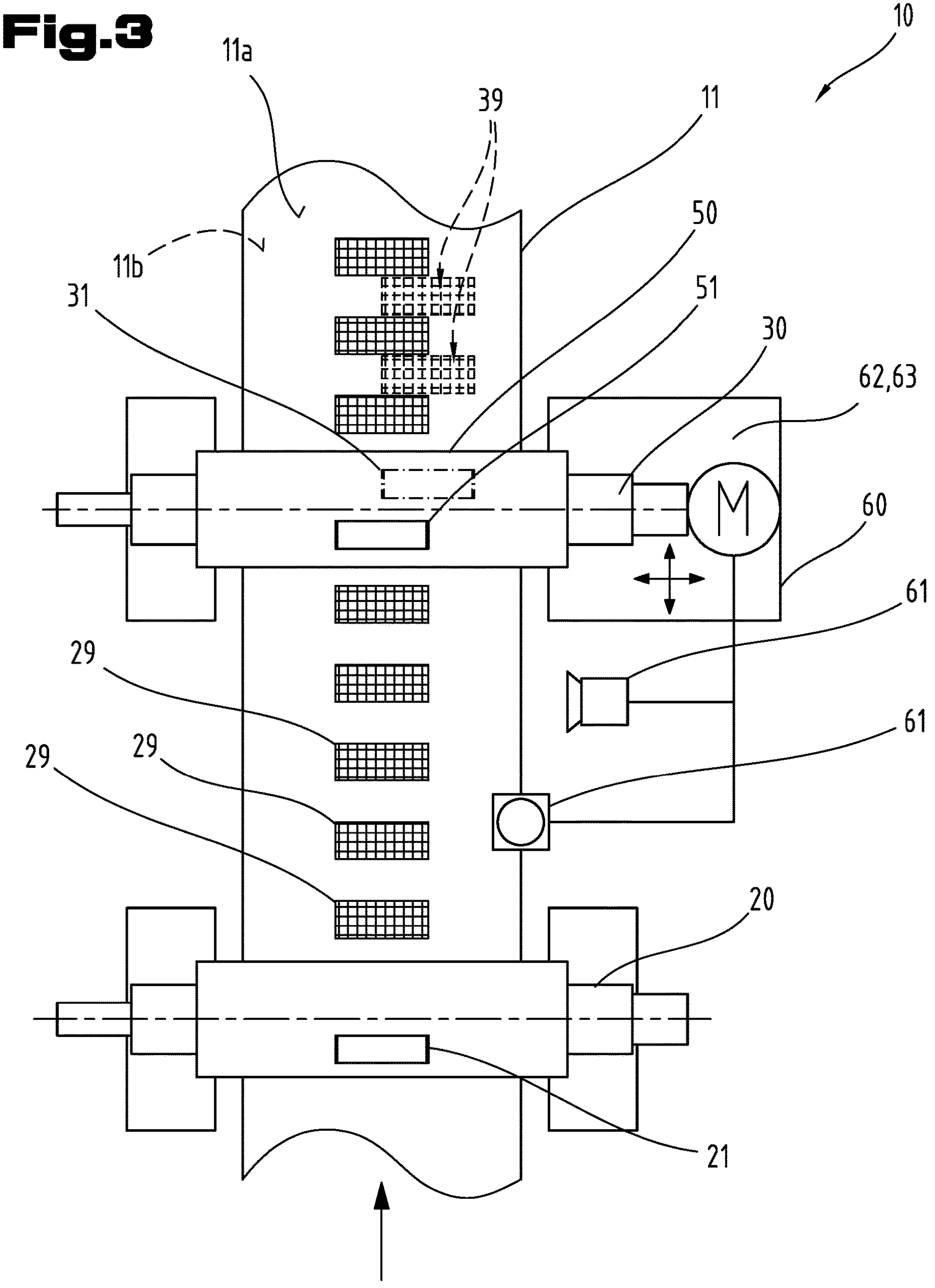
FIG. 3 a grossly schematic coating device in a top view.

FIG. 3 shows another and optionally independent embodiment of the coating device, wherein the same reference numbers as in the preceding FIG. 1 are used for the same parts. To avoid unnecessary repetitions, the detailed description in the preceding FIG. 1 should be noted and/or is referred to.

Specifically, FIG. 3 shows a grossly schematic representation of a coating device 10 in a top view. For better clarity, the nozzles and stripping means, for example, are not represented in FIG. 3.

Here, the first cavity 21 of the first coating roll 20 is configured in the center and/or middle of the roll. In the view represented, from above onto the coating device 10, the first mating roll 40, which is arranged beneath the first coating roll 20, is not visible. When running through the coating device 10 in processing direction (represented by an arrow), a first coated region 29 is applied to the first carrier sheet side 11*a* and/or to the top side of the carrier sheet 11. Here, the dimension of the region 29 corresponds to that of the first cavity 21. In the further run through the coating device 10, the carrier sheet 11 is guided through a second pair of rolls, specifically through a second mating roll 50 and through a second coating roll 30. The second mating roll 50, which acts in equal measure as the first coating roll 20 on the first carrier sheet side 11*a* and/or on the top side of the carrier sheet 11 represented, has a mating cavity 51 here, which corresponds to the first cavity 21, i.e. is at least approximately identical to same in size and shape. It may also be the case that the mating cavity 51 is larger than the first cavity 21. When running through the second pair of rolls, the first coated region 29 hence remains undamaged and/or uninfluenced by the mating roll 50 because same is received exactly and/or in its exact position by the mating cavity 51. By means of the second coating roll 30, which has a second cavity 31, a second coated region 39 is applied to the second carrier sheet side 11*b* and/or to the bottom side of the carrier sheet 11. In the exemplary embodiment represented, the second coated region 39 is configured so as to be offset to the first coated region 29 in two axes. It should be understood that the precise arrangement of the regions 29, 39 is at the discretion of the skilled person and/or in accordance with the specific requirements for the product to be made.

Furthermore, FIG. 3 shows an outline of a carrier sheet positioning device 60, which can be operatable by means of a motor. In the example represented, the carrier sheet positioning device 60 is arranged at the second pair of rolls, in particular at the second coating roll 30. Evidently, the carrier sheet positioning device 60 can also be coupled with both pairs of rolls, or it may also be the case that another carrier sheet positioning device 60 is configured, which is arranged at the first pair of rolls. The carrier sheet positioning device 60 can be configured with a sliding means 62 for sliding the second coating roll 30. In addition, the carrier sheet positioning device 60 can be configured with a carrier sheet moving means 63 for moving the carrier sheet 11. Conceivable directions of movement and/or positioning which can be executed by means of the carrier sheet positioning device 60 are indicated in FIG. 3 by means of direction arrows. FIG.

3 also shows that a region detection device 61 can be configured, which is provided for detecting the first coated region 29 on the first carrier sheet side 11*a*. In the example represented, the region detection device 61 is coupled with the drive of the carrier sheet positioning device 60 and/or supplied with energy by same. The region detection device 61 can be configured with a camera and with a limit switch, for example.

The exemplary embodiments show possible embodiment variants, wherein it should be noted in this respect that the disclosure is not restricted to these particular illustrated embodiment variants of it, but that rather also various combinations of the individual embodiment variants are possible and that this possibility of variation owing to the teaching for technical action provided by the present disclosure lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

Any and all specifications of value ranges in the description at issue are to be understood to comprise any and all sub-ranges of same, for example the specification 1 to 10 is to be understood to mean that any and all sub-ranges starting from the lower limit 1 and from the upper limit 10 are comprised therein, i.e. any and all sub-ranges start at a lower limit of 1 or larger and end at an upper limit of 10 or less, e.g. 1 to 1.7, or 3.2 to 8.1, or 5.5 to 10.

Finally, as a matter of form, it should be noted that for ease of understanding of the structure, elements are partially not depicted to scale and/or are enlarged and/or are reduced in size.

The invention claimed is:

1. A coating device for the register-accurate application of plastic material to a carrier sheet, comprising:
- a first coating roll, and
- a second coating roll downstream from the first coating roll,
- wherein the first coating roll has at least one first cavity and can be filled with plastic material by means of at least one first nozzle, and
- wherein the second coating roll has at least one second cavity and can be filled with plastic material by means of at least one second nozzle, and
- wherein a first stripping means strips the first coating roll and a second stripping means strips the second coating roll, and
- wherein the first coating roll interacts with a first mating roll and coats a first carrier sheet side and the second coating roll interacts with a second mating roll and coats a second carrier sheet side, and
- wherein the second mating roll comprises at least one mating cavity corresponding to the at least one first cavity, and
- the coating device further comprising
- at least one carrier sheet positioning device, and
- at least one region detection device configured to detect a position of a first coated region of plastic material coated by the at least one first cavity.

2. The coating device according to claim 1, wherein at least one inner surface of at least one of the cavities has a structure.

3. The coating device according to claim 1, wherein at least one inner surface of at least one of the cavities has a coating.

4. The coating device according to claim 1, further comprising a thickness measure with respect to a filling of the at least one first cavity and/or of the at least one second cavity.

5. The coating device according to claim 1, wherein the carrier sheet positioning device comprises at least one of a sliding means of the first and/or second coating roll, or at least one carrier sheet moving means.

6. The coating device according to claim 1, wherein the region detection device comprises at least one of a mechanical sensor, an optical sensor or a coding at the first and/or second coating roll.

7. The coating device according to claim 1, wherein the region detection device detects the position of at least one edge of the first coated region and/or of at least one edge of the carrier sheet.

8. The coating device according to claim 1, further comprising a dispenser unit for applying at least one film strip.

9. The coating device according to claim 8, wherein the at least one film strip is applied to the carrier sheet by the dispenser unit along at least one edge of the first and/or second coated region.

10. The coating device according to claim 1, further comprising at least one plasticizing unit, which is arranged upstream of the at least one first nozzle and/or of the at least one second nozzle.

11. The coating device according to claim 1, wherein the first and/or second stripping means comprises at least one of a squeegee or a squeegee roll.

12. The coating device according to claim 1, wherein the at least one first nozzle and/or the at least one second nozzle are adjustable.

13. The coating device according to claim 1, further comprising at least one cleaning unit for cleaning the carrier sheet, wherein the at least one cleaning unit is provided and suitable for cleaning at least one side of the carrier sheet.

14. The coating device according to claim 1, further comprising at least one roughening unit for roughening the carrier sheet, wherein the at least one roughening unit is provided and suitable for roughening at least one side of the carrier sheet.

15. The coating device according to claim 1, further comprising at least one smoothing unit for smoothing the carrier sheet, wherein the at least one smoothing unit is provided and suitable for smoothing at least one side of the carrier sheet.

16. The coating device according to claim 1, further comprising at least one processing unit for processing the carrier sheet, wherein the at least one processing unit is provided and suitable for processing at least one side and/or one edge of the carrier sheet.

17. The coating device according to claim 10, wherein a mixer is arranged upstream of the at least one plasticizing unit.

18. The coating device according to claim 10, wherein the at least one plasticizing unit is controlled via a throughput control.

19. The coating device according to claim 10, wherein a feed block is arranged between the at least one plasticizing unit and the at least one first nozzle and/or the at least one second nozzle.

20. The coating device according to claim 1, wherein the at least one first nozzle and/or the at least one second nozzle are each configured as a deposit unit comprising multiple nozzles, and wherein the multiple nozzles apply the plastic material to the first coating roll and/or second coating roll in succession or next to one another or so as to overlap.

21. The coating device according to claim 20, wherein the first and/or second nozzles are provided and suitable for inserting different plastic materials in the cavity.

22. The coating device according to claim 1, wherein the at least one first cavity and/or the at least one second cavity have different levels and each level is assigned at least one nozzle and at least one stripping unit.

* * * * *